May 27, 1941.　　E. I. ANDERSON ET AL　　2,243,408
VISUAL TUNING INDICATOR
Filed May 12, 1938
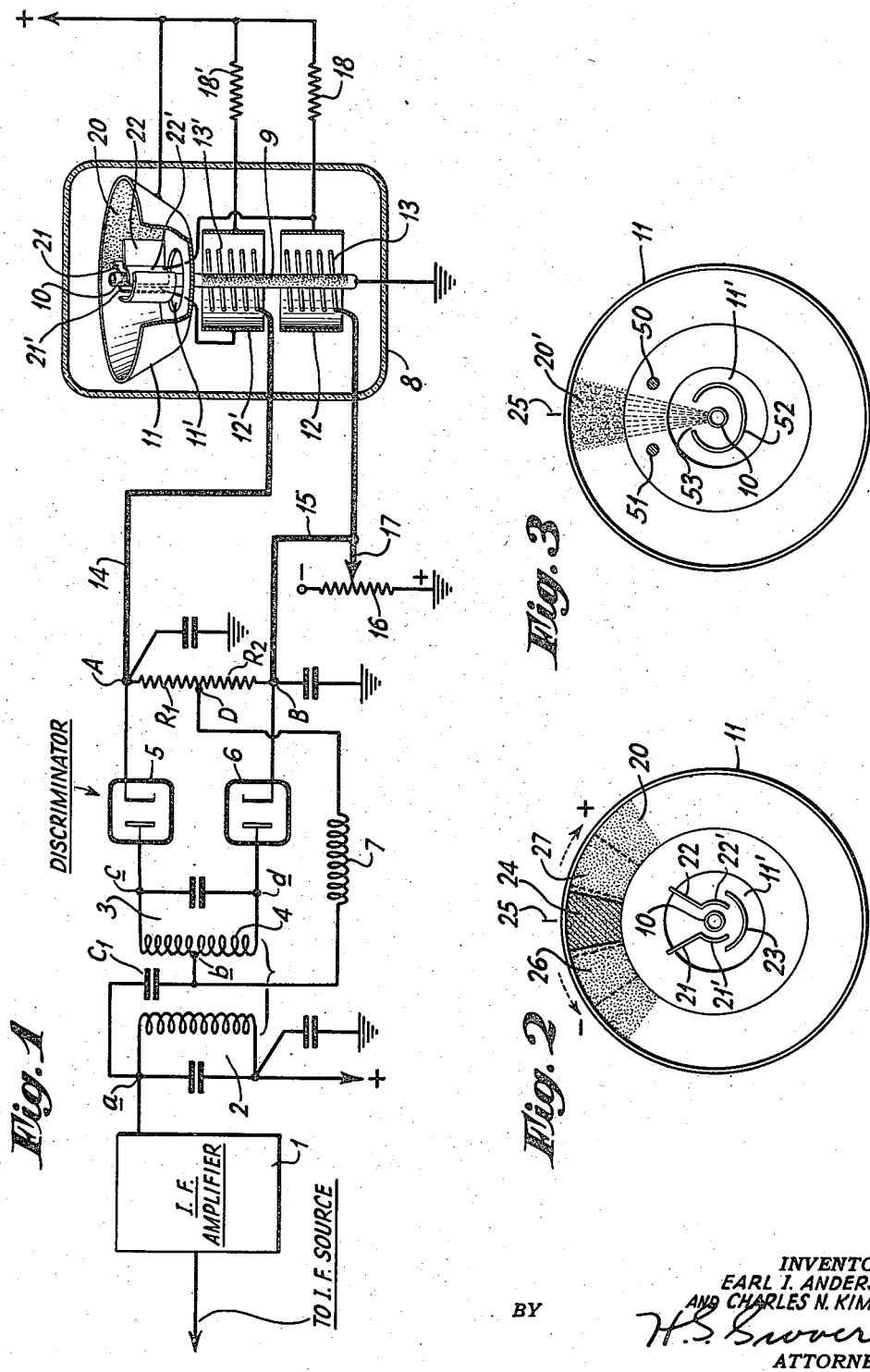
INVENTORS
EARL I. ANDERSON
AND CHARLES N. KIMBALL
BY
ATTORNEY.

Patented May 27, 1941

2,243,408

UNITED STATES PATENT OFFICE 2,243,408

VISUAL TUNING INDICATOR

Earl I. Anderson, Bayside, Long Island, N. Y., and Charles N. Kimball, East Orange, N. J., assignors to Radio Corporation of America, a corporation of Delaware Application May 12, 1938, Serial No. 207,440

1 Claim. (Cl. 171—95)

Our present invention relates to visual tuning indicators, and more particularly to indicators of the electron ray type adapted to indicate the sense of detuning of a receiving system.

Electron ray indicator tubes of the type disclosed and claimed by H. M. Wagner in U. S. P. 2,051,189 of Aug. 18, 1936, are affected by variations in carrier amplitude as well as by changes in resonance. Various arrangements have been proposed to overcome this disadvantage, but circuit and tube complications have resulted. The ideal electron ray indicator tube, when used as a resonance indicator in a radio receiver, should indicate resonance at a central position, improper tuning resulting in a deflection of the indication area to one side or the other of the central position depending upon which side of resonance the receiver is tuned.

Hence, it may be stated to be one of the main objects of our present invention to provide an electron ray indicator tube which will result in deflection of an indication beam to one side or the other of a central position, depending upon which side of resonance a receiver is tuned.

Another important object of the invention is to provide a tuning indicator tube for a radio receiver wherein the tube comprises a fluorescent target, a cathode and a pair of deflection electrodes; the deflection electrodes being connected to a frequency discriminator network so as to shift the position of an illuminated area on the fluorescent target with respect to a predetermined central position as the receiver is tuned to, or from, resonance with a desired signal carrier frequency.

Another object of our invention is to provide an electronic indicator tube which is provided with a cathode, a fluorescent target and a pair of deflection electrodes so arranged as to project upon the target an electron beam; the tube further including a pair of direct current amplifier sections independently connected to the deflection electrodes for energizing the latter in opposed polarity senses.

Still other objects of our invention is to improve generally the simplicity and efficiency of electronic tuning indicators for radio receivers, and more especially to provide such an indicator which is not only reliable and efficient in operation, but economically manufactured and assembled.

The novel features which we believe to be characteristic of our invention are set forth in particularity in the appended claim; the invention itself, however, as to both its organization and method of operation will best be understood by reference to the following description taken in connection with the drawing in which we have indicated diagrammatically several circuit organizations whereby our invention may be carried into effect.

In the drawing:

Fig. 1 is a circuit diagram of an embodiment of our invention.

Fig. 2 is a plan view of the indicator tube in Fig. 1, and showing the fluorescent target section.

Fig. 3 is a modified form of indicator tube construction embodying our invention, and showing a plan view similar to that of Fig. 2.

Referring now to the accompanying drawing, there is shown in Fig. 1 a circuit which comprises those portions of a superheterodyne receiver essential to an understanding of our invention; and those skilled in the art will understand that the numeral 1 denotes the intermediate frequency (hereinafter designated as I. F.) amplifier which is fed from the I. F. output circuit of the first detector, or from a preceding I. F. amplifier. Of course, the receiver will include the usual signal collecting device which feeds a tunable radio frequency amplifier; and the latter will feed the amplified signals to a tunable first detector which is in turn fed with local oscillations from a tunable local oscillator. The receiver may be that usually employed in the broadcast range of 500 to 1500 kc., and the customary uni-control tuning device will be employed to vary the frequency of each of the aforesaid tunable circuits. The amplified I. F. energy develops voltage across the primary circuit 2, and the latter is magnetically coupled to the secondary circuit 3. Each of circuits 2 and 3 is resonated to the operating I. F., and the circuit 3 is the common input circuit of the discriminator network. The mid-point $b$ of coil 4 is connected to the high potential side $a$ of primary circuit 2 through a direct current blocking condenser $C_1$. The diode 5 has its anode connected to one side $c$ of the secondary circuit 3, while its cathode is connected to the point A of the resistor $R_1$. The diode 6 has its anode connected to the opposite side $d$ of the secondary circuit 3, while its cathode is connected to the point B of resistor $R_2$.

The resistors $R_1$ and $R_2$ are arranged in series, and the junction D thereof is connected to the mid-point $b$ on coil 4 through an I. F. choke coil 7. The points A and B are connected to ground through I. F. bypass condensers. The discriminator network which has been described up to this point has been disclosed and claimed by S. W. Seeley in application Serial No. 45,413, filed Oct. 17, 1935 and granted June 21, 1938, as U. S. P. 2,121,203. It functions to produce a direct current voltage across the common output resistor $R_1$—$R_2$ in response to a frequency departure of the I. F. energy from an assigned I. F. value. The direct current voltage is employed in connection with the electronic indicator tube which is to be described. It will be understood, of course, that the usual second detector network may be coupled to the primary circuit 2, and the detected energy will be employed in any desired type of audio amplifier and reproducer. On the other hand, if desired, audio voltage may be derived from point D, as explained in the aforesaid Seeley patent.

To recapitulate the functioning of the discriminator network, it is assumed that the intermediate frequency energy is delivered by the amplifier 1 to the primary circuit 2. The coil of this circuit is loosely coupled to coil 4 of the secondary circuit 3. Condenser $C_1$ is supposed to be so large that the voltage drop in it is negligible. That is, points $a$ and $b$ are at the same potential. Now, the phase of point $a$ with respect to ground potential is zero when the I. F. energy has the assigned frequency value, for at resonance there is no phase shift in the primary circuit 1. Hence, point $b$ is at zero phase. The current in primary circuit 1 produces a voltage in circuit 2, and this is distributed equally about the mid-point $b$. At a given instant point $c$ on coil 4 is as much positive as point $d$ is negative. The voltages impressed on rectifiers 5 and 6 are, therefore, equal, although opposite in phase. The rectified outputs depend only on the magnitude, and hence the voltage drops across $R_1$ and $R_2$ will be equal. It is assumed that the magnitudes of $R_1$ and $R_2$ are equal.

Since the two rectifiers are connected in series opposition the potential difference between points A and B would be zero. This balance occurs only when the frequency of the I. F. energy is equal to the resonance frequency of each of the circuits 2 and 3. If, now, the I. F. energy shifts from this resonant frequency, there will then occur a phase shift of nearly 90 degrees in circuit 2. The voltages induced in the two halves of coil 4 are still equal in magnitude and opposite in phase with respect to point $b$. However, the voltage drop across circuit 2 is now added vectorially to the induced voltages. Thus, the potential at one side of the secondary coil 4, say point $c$, will be the sum of the induced voltage $b$—$c$ and the voltage drop across circuit 2, while the potential of the point $d$ will be the difference between the drop in circuit 2 and the voltage induced in the portion of coil 4 between points $b$ and $d$. It follows that the input voltage of one rectifier, rectifier 5 in the assumed case, is much greater than in the other. Therefore, the voltage drop across resistor $R_1$ will be greater than that across resistor $R_2$ and point A will be positive with respect to point B. On the other hand, when the I. F. energy shifts in frequency to the opposite direction of the resonant frequency, the same reasoning leads to the conclusion that point A is negative with respect to point B. Hence, depending on the sense of the detuning of the receiver, the point A can assume either a positive or a negative potential with respect to point B and the magnitude of the potential of point A depends on the amount of detuning.

Having a direct current potential at point A which is capable of changing its polarity and magnitude in response to a shift in signal carrier energy from an assigned frequency value, this direct current potential can be utilized to produce a visual indication of the detuning. This is accomplished by utilizing an electronic indicator tube which, in general, is of the 6E5 type. The tube shown in Figs. 1 and 2 differs from the 6E5 type tube, or from the type of tube described in the aforesaid Wagner patent, in the manner to be described below.

The tube generally comprises an envelope 8 which has within it a grounded cathode divided into two emission sections. One of these sections 9 provides an electron flow of a pair of triode sections, while the emission section 10 provides electrons for the fluorescent target 11. One of the pair of triode sections comprises a cylindrical plate 12 and a control grid 13 disposed between the emitter 9 and the plate 12. The other triode section comprises a similar pair of electrodes comprising a plate 12' and a control grid 13'. The control grid 13' is connected by lead 14 to point A of resistor $R_1$, while lead 15 connects control grid 13 to the point B. The control grid 13 is connected to any desired point on a voltage supply bleeder resistor 16 by means of an adjustable tap 17, and it is to be understood that the bleeder resistor 16 may be a section of the usual voltage supply potentiometer of a radio receiver. It will be observed, therefore, that grids 13 and 13' are established at a negative potential with respect to the grounded emitter 9 when the I. F. energy has a frequency equal to the assigned frequency of circuits 2 and 3.

The plates 12 and 12' are each connected to a source of positive potential, say +250 volts, through resistors 18 and 18', and the voltage drops across these resistors determine the potential of each of the deflection electrodes adjacent the fluorescent target 11. The emission section 10 is disposed in the center of the target 11; the latter is generally dish-shaped. An aperture 11' is provided in the base of the target; the emitter 10 is disposed in the center of the aperture 11'. The interior face of the outwardly flared wall of the target is provided with a coating of fluorescent material at a sector 20. It is only necessary to coat a portion of the interior face because the area to be illuminated is a restricted one.

The deflection electrodes 21 and 22 comprise rectangular strips of metal arranged at the angles shown more clearly in Fig. 2. Electrode 21 is connected to plate 12', while electrode 22 is connected to plate 12. The deflection electrodes are disposed at angles such that the electron beam from emitter 10 will be shifted to the right or left of a central point on coating 20 depending upon the potential of point A of the discriminator. The electrodes 21 and 22 are disposed adjacent emitter 10, and may be provided with electron concentration sections 21' and 22'. If desired, a rear focusing electrode 23 may be employed. In this way there is provided a sheet, or wide ray, of electrons which impinges on the central section 24 of coating 20 and causes fluorescence thereof. A mark 25 may be placed at the central point of coating 20 to indicate the extent of shift of the fluorescence when the receiver is detuned.

To explain the operation of the indicator circuit, let it first be assumed that the I. F. energy has a frequency equal to that of the resonant circuits 2 and 3. In that case the point A is at the same potential as point B, and both points are negative with respect to the emitter 9 by the drop across the section of resistor 16 between tap 17 and ground. Hence, the deflection electrodes will be at the same direct current potential with respect to emitter 10, since resistors 18 and 18' are assumed to be of equal value. Electrons from emitter 10 will be repelled towards the central area 24 by the deflection electrodes 21 and 22. The user then knows that the receiver is correctly tuned. Changes in carrier amplitude will not affect the appearance of area 24, since point A is responsive solely to frequency shifts of the applied signal carrier.

If, now, the point A assumes a negative potential, because the I. F. energy shifts in frequency to one side of the assigned I. F. value, the grid 13' will be more negative than grid 13. The electrode 21 will become more positive than electrode 22, since the drop across resistor 18' is caused to decrease by the increased negative bias of grid 13'. The net effect on the electrons emitted from emitter 10 is to shift the fluorescent area 24 towards the more positive electrode 21. The target 11 is assumed to be at a fixed positive potential. Hence, as shown in Fig. 2, the area 24 will shift to the position 26 thereby denoting that the receiver is detuned to, for example, the lower side band of the I. F. carrier. The set operator can readily tune the receiver to restore the fluorescent area, or indication, on target 11 to position 24.

Conversely, when the I. F. energy shifts to the upper sideband of the I. F. carrier, the point A assumes a positive potential with respect to point B. The grid 13' causes a greater drop across resistor 18', and electrode 21 becomes less positive than electrode 22. The net result is to shift the fluorescent area to position 27. The minus and plus signs in Fig. 2 indicate the direction of shift of the area 24 when the point A changes polarity. The extent of the shift of area 24 to positions 26 and 27 depends on the magnitude of the potential at point A. If desired there can be provided a scale calibrated in kc. (kilocycles) adjacent coating 20 so that the user may readily tell the extent of detuning of the set. It should be especially noted that the indicator appears similar to a meter with an illuminated pointer, the latter assuming a central position only for correct tuning.

In Fig. 3 is shown a modified form of indicator tube. The coating 20' is made narrower, and is of a width such that the entire area is fluorescent when the deflection electrodes 51 and 50 are at the same potential. It is to be understood that the modification of Fig. 3 can be the same as the indicator tube shown in Figs. 1 and 2, except for the fact that the deflection electrodes 21 and 22 will be respectively replaced by rods 51 and 50. The concentration of the electron beam is secured by means of the element 52 which may be a metallic cylinder having a longitudinal opening 53 cut in the wall thereof so as to provide a slit through which the electrons from the emitter 10 can pass and impinge upon the fluorescent coating 20'. When this form of tube is used the area 20' will be illuminated at correct tuning. However, when the rod 51 assumes a positive potential with respect to rod 50, for the reasons stated in connection with Figs. 1 and 2, the electrons will be attracted towards rod 51 and the fluorescent area 20' will appear to be shifting to the left of the central mark 25. Conversely, when the rod 51 becomes negative with respect to rod 50 the electrons will be repelled towards rod 50, and the area 20' will appear to become fluorescent to the right of mark 25.

It is to be clearly understood that the indicator tube disclosed in this application may be employed in connection with other uses. For example, it can be used to indicate the change in polarity of a point in any direct current circuit. Again, the emitter 10 may have an emission surface provided only upon that portion of its face which faces the slit 53. It is also to be understood that the specific type of discriminator disclosed in Fig. 1 need not be employed since any other type of frequency discrimination network can be used, provided it develops a direct current potential which changes in polarity and magnitude in response to a change in the frequency of applied wave energy.

While we have indicated and described several systems for carrying our invention into effect, it will be apparent to one skilled in the art that our invention is by no means limited to the particular organization shown and described, but that many modifications may be made without departing from the scope of our invention, as set forth in the appended claim.

What we claim is:

In combination with a resistive impedance whose terminals are normally of like direct current voltage polarity and magnitude and adapted to vary in opposite polarity and magnitude senses, an indicating device for said variation comprising a tube envelope, an electron emitter within said envelope, a positively biased target electrode surrounding said emitter, said target being provided with a visible area of predetermined extent which is caused to be fluorescent in response to electrons projected from said emitter upon said area, at least two deflection electrodes positioned between the emitter and said target area, the deflection electrodes being arranged on opposite sides of the electron stream projected upon said area, means for establishing each deflection electrode at a positive potential which is sufficiently less than the target potential to cause said stream to be concentrated upon a relatively narrow central section of said area thereby to provide on the target a narrow fluorescent indication which is representative of said normal voltage state of said impedance terminals, a first direct current voltage amplifier having an input electrode connected to one of said terminals and an output electrode connected to one of said deflection electrodes, a second direct current voltage amplifier having an input electrode connected to the opposite terminal and an output electrode connected to the second deflection electrode, means in circuit with said impedance for normally applying a negative biasing potential to said input electrodes, variation of said terminal potentials from said normal state causing a corresponding variation in the relative potentials of said deflection electrodes thereby to shift the fluorescent indication in a predetermined direction and to a predetermined extent relative to said central section.

EARL I. ANDERSON.
CHARLES N. KIMBALL.